Sept. 12, 1961            S. S. BROWN            2,999,920
REVERSIBLE GEARED HEAD ELECTRIC MOTOR
AND CONTROL SYSTEM THEREFOR
Filed July 15, 1957            3 Sheets-Sheet 1
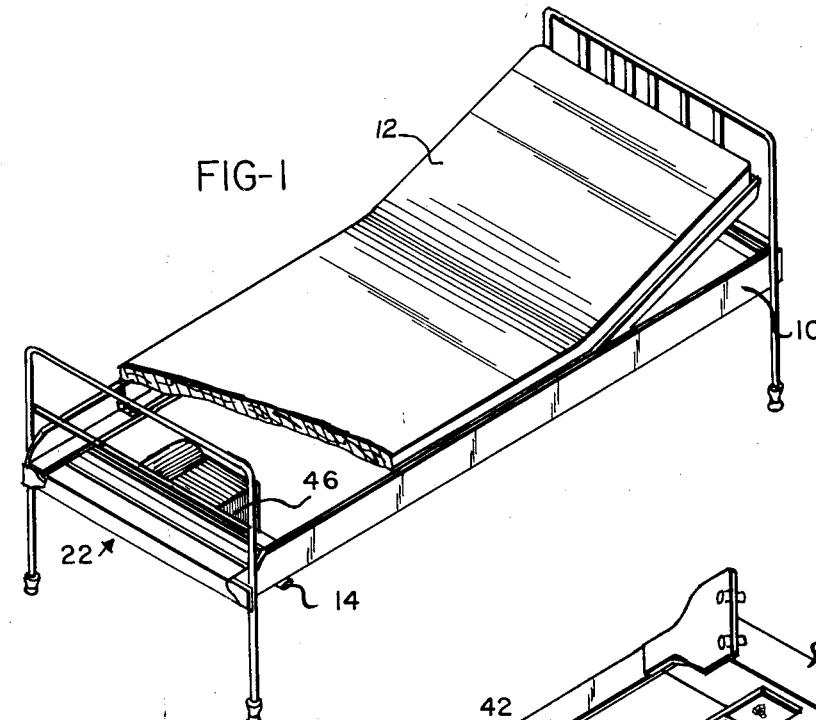
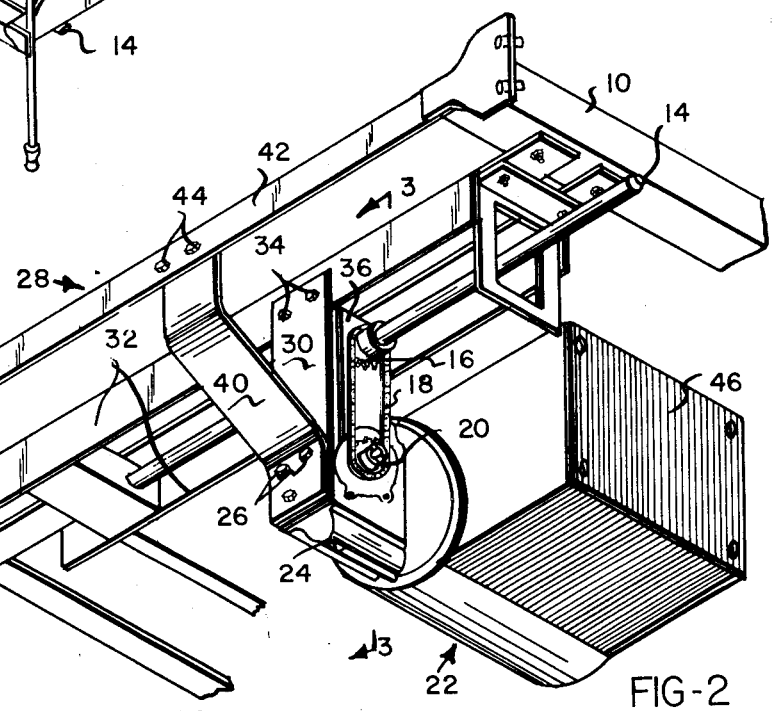
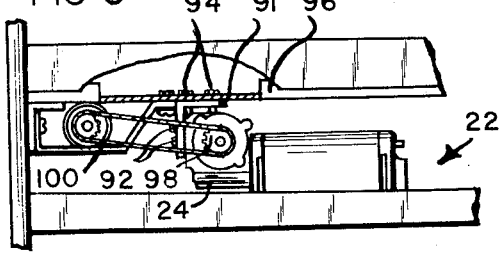
INVENTOR.
STEFFEN S. BROWN
ATTORNEYS

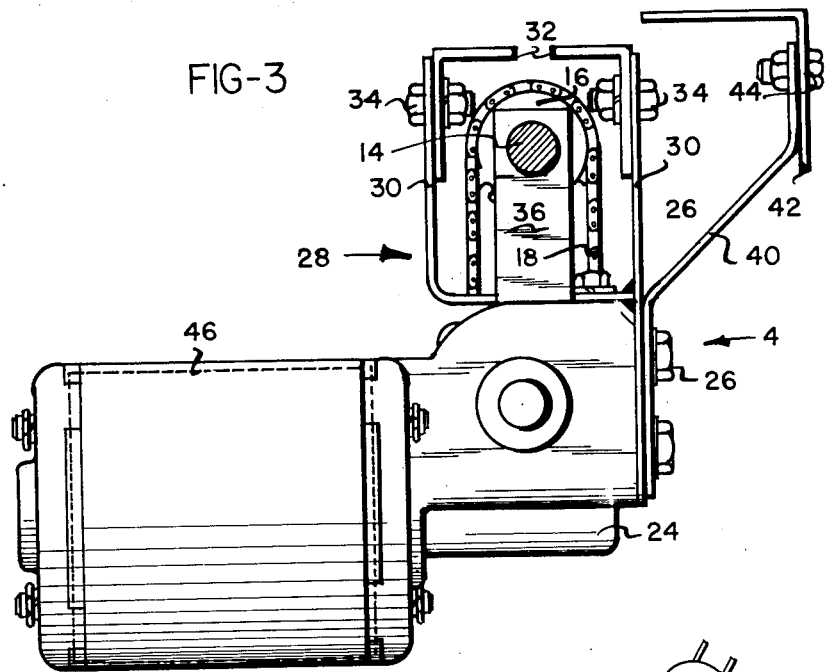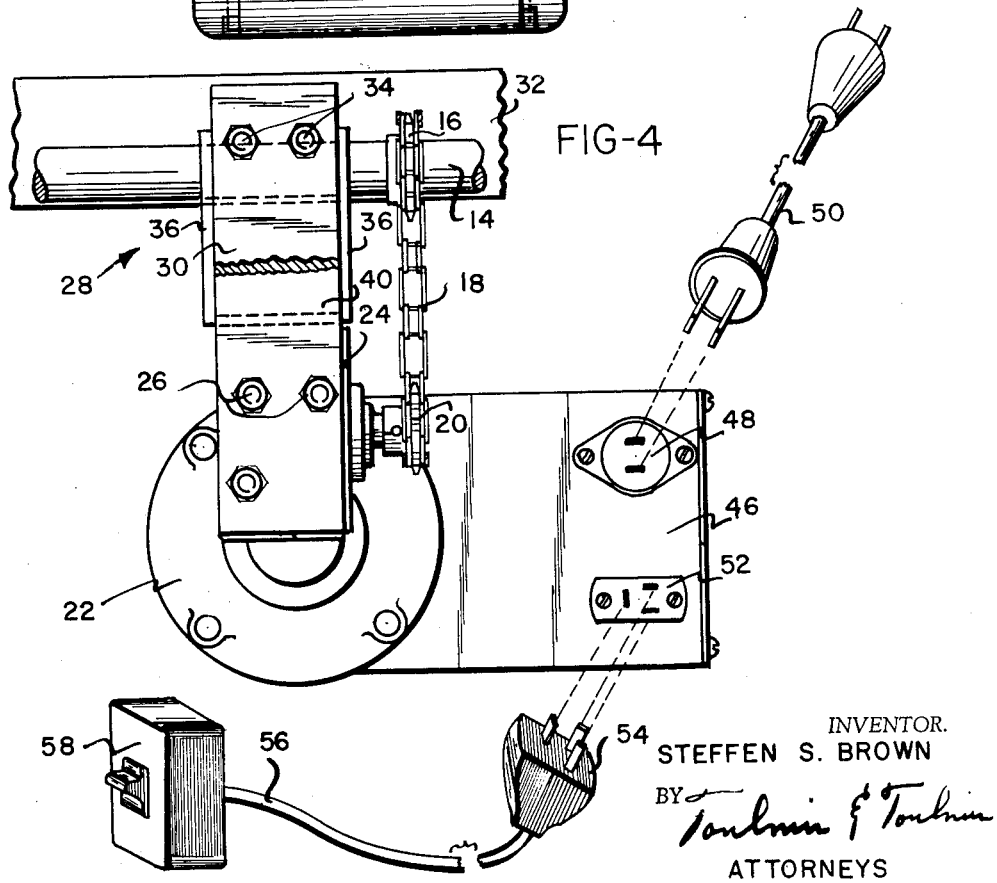

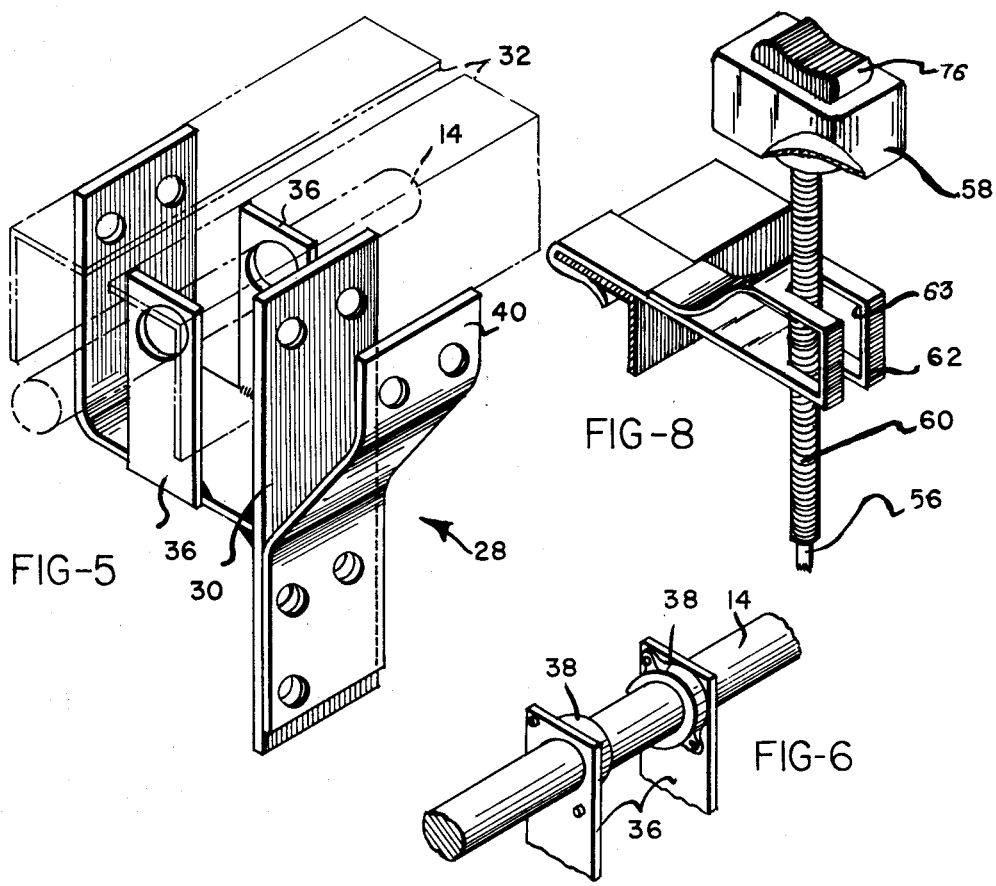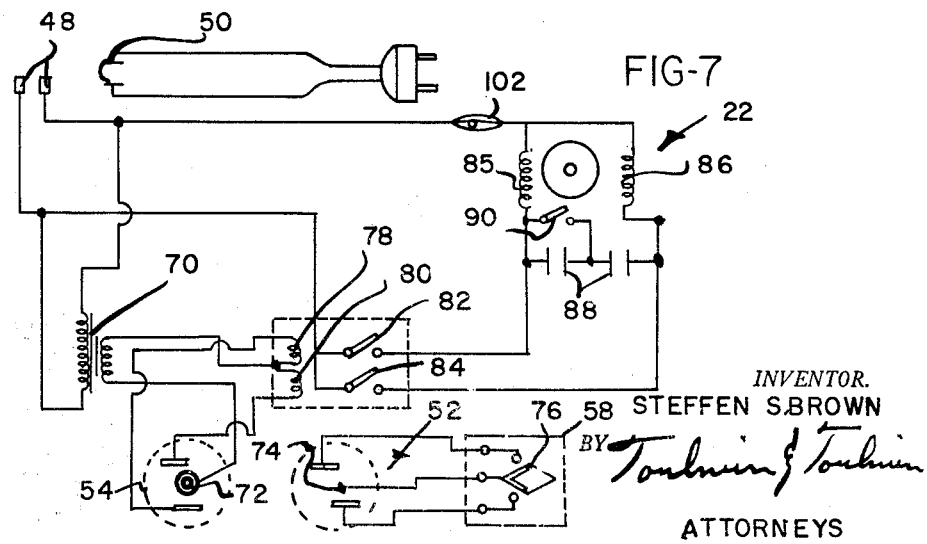

United States Patent Office 2,999,920
Patented Sept. 12, 1961

2,999,920
REVERSIBLE GEARED HEAD ELECTRIC MOTOR AND CONTROL SYSTEM THEREFOR
Steffen S. Brown, Dayton, Ohio, assignor to The Brown-Brockmeyer Company, Dayton, Ohio, a corporation of Ohio
Filed July 15, 1957, Ser. No. 672,057
2 Claims. (Cl. 200—168)

This invention relates to reversible electric motors, and particularly to reversible electric motors and a novel control system therefor and a mounting arrangement therefor.

One of the more recent developments in hospital beds is the application of electric motors to the adjustments of the beds so that they can be raised and lowered at the head end thereof and other parts moved under power and, sometimes, at the option of the patient occupying the bed. It is in connection with an electric motor arrangement especially adapted for this particular type of service that the present invention is concerned.

The present invention has as a primary object the provision of an improved mounting arrangement for a reversible electric motor such that the motor can be mounted on substantially any conventional hospital bed and utilized therewith.

Another object of this invention is the provision of a reversible electric motor and a mounting arrangement therefor and a drive extending from the motor such that the motor can be attached to substantially any type hospital bed and drivingly connected with one or more of the adjustments thereof.

A particular object of the present invention is the provision of the combination of a reversible electric motor adapted for being powered by conventional voltage but having a low voltage control system associated therewith, thereby insuring complete safety for the occupant of the bed that operates the motor through the control system.

A still further object of this invention is the provision of a reversible electric motor especially adapted for being associated with a hospital bed in which the limit switches and the like are eliminated, thereby greatly simplifying the construction and installation of the motor.

A still further object is the provision of a reversible electric motor adapted for being mounted on a hospital bed so arranged that the power supply to the motor can readily be unplugged therefrom and also so arranged that the control switch portion can be unplugged from the motor.

These and other objects and advantages will become more apparent from reference to the drawings, in which:

FIGURE 1 is a perspective view of a hospital bed having an electric motor installation according to the present invention arranged for raising and lowering the head end of the bed;

FIGURE 2 is a perspective view looking in from the foot end and from somewhat below the bed showing the bracket supporting the motor on the bed and the drive connection between the motor and the adjusting mechanism for the head end of the bed;

FIGURE 3 is a vertical sectional view indicated by line 3—3 on FIGURE 2 showing more in detail the manner in which the motor is connected with the supporting bracket therefor;

FIGURE 4 is a view looking in in the direction of the arrow 4 in FIGURE 3 showing the motor and bracket and the control unit carried by the motor;

FIGURE 5 is a perspective view showing one type of mounting bracket forming a part of this invention by means of which the motor is supported on the bed;

FIGURE 6 is a fragmentary perspective view showing the manner in which bearings or bushings can be provided in the motor supporting bracket for receiving and supporting the rotary shaft forming a part of the adjustment for the bed;

FIGURE 7 is a diagrammatic representation of a preferred type of control system according to the present invention;

FIGURE 8 is a perspective view showing one form which the manually operated control switch for the electric motor can take; and FIGURE 9 is a fragmentary view showing still another type of mounting bracket for supporting the motor according to this invention.

Referring to the drawings somewhat more in detail, the bed 10 illustrated in FIGURE 1 may be substantially any conventional type of hospital bed and may, as it customary with beds of this nature, comprise a plurality of adjustments, one of which may include a movable head part 12. It will be understood that the bed could be arranged to raise and lower at either end, or to buckle in the middle, or the entire bed could be arranged to raise and lower, all as is well known in this art.

The raising and lowering of head portion 12 of the bed is adapted for being accomplished by rotation of a shaft 14 which, in manually-operated beds, is rotated by a crank.

According to the present invention, shaft 14, as will best be seen in FIGURE 2, has mounted thereon a sprocket 16 over which runs a chain 18 which also passes about a sprocket 20 on the output shaft of a geared head electric motor 22. It will be evident that reversible energization of motor 22 will result in reversible operation of shaft 14, whereby the head portion of the bed can be raised and lowered by power at will.

Motor 22, as will be seen in FIGURES 2 through 5, includes a housing 24 in which the reduction gearing, preferably a worm and wheel, is located. This housing portion is preferably an integral part of the adjacent end frame of the motor and thus the entire motor is rigid with housing 24.

The housing 24 is attached by cap screws 26 to a bracket generally indicated at 28 and which comprises spaced upstanding leg parts 30 that embrace the transversely extending angles or channel means 32 of the frame of the bed. Bolts 34 fixedly connect leg portions 30 with the frame of the bed.

Bracket 28 has another pair of upstanding legs 36 through which the shaft 14 extends toward the upper ends of the said legs. These legs 36 may, as illustrated in FIGURE 6, comprise bearing or bushing means 38 for supporting shaft 14 where such support is necessary.

The bracket 28 may comprise only the portions identified above or there may also be provided in many cases the additional element 40 extending from the outer part of housing 24 upwardly at an angle to be connected with a frame member 42 of the bed by a bolt 44. This additional brace, when employed, provides for even greater rigidity of support of the motor.

As will best be seen in FIGURES 2 and 4, motor 22 has mounted on one side thereof a control box 46 within which is located the relays and condensers and the like by which the motor is controlled. Box 46 includes a receptacle 48 adapted for receiving the end of a lead-in cable 50 for the supply of operating voltage to the motor.

A second receptacle 52 is also provided, adapted for receiving the plug end 54 of a low voltage control cable 56 that terminates in a manual switch means 58 that is positioned so that it can be controlled by the occupant of the bed.

As will be seen in FIGURE 8, switch 58 may be mounted on the upper end of a flexible support element 60, and which element 60 is adjustably attached to the frame of the bed by spring clip 62. Swith 58 is of the type that is normally open but the movable part thereof is adapted for being tipped one way to produce rotation of the electric motor in one direction while being tipped the other way will produce rotation of the motor in the opposite direction. Clip 62 is preferably mounted on the movable part of the bed so as always to be within reach of the patient while the support element 60 can readily be removed from the clip at any time by pulling it from the slot 63.

According to this invention the size of the electric motor is so selected that it will stall without breaking any of the driving parts when the head portion of the bed reaches the limit of its travel. Limit switches are thus eliminated merely by selecting the horsepower of the motor slightly greater than the maximum amount required to raise the bed and patient.

A typical control circuit is illustrated in FIGURE 7 wherein it will be noted that there is provided a stepdown transformer 70, the secondary of which has one end connected with terminal 72 of plug 54 and which terminal is adapted for engaging terminal 74 of receptacle 52 and which last terminal leads to the movable portion 76 of control switch 58.

A suitably low voltage, for example, 24 volts, is provided by the secondary transformer 70 so that there is no hazard whatsoever to the occupant of the bed in controlling the motor 22.

Relay 78 has a blade 82 and relay 80 has a blade 84. When blade 82 is closed, field coil 85 is connected directly across the line whereas field coil 86 is connected across the line through condensers 88. This provides for one direction of rotation of the motor. Centrifugal switch 90 responsive to motor speed is adapted for opening at a predetermined motor speed.

When relay blade 84 is closed, the opposite conditions obtain and the motor runs in the reverse direction.

It will accordingly be appreciated that the operation of the motor is readily under the control of the patient and can be operated in either direction or halted by manipulation of switch 58 and that this can be done readily by the occupant of the bed without any hazard whatsoever on account of the low voltage of the control circuit.

Furthermore, the motor can readily be unplugged from its source of power to permit movement of the hospital bed and, similarly, the control switch can readily be unplugged when it is not desired for the operation of the bed to be under the control of the occupant.

The shape of housing 24 lends itself to other types of support of the motor on the hospital bed frame as is illustrated in FIGURE 9. In FIGURE 9, it will be noted that there is an angle member 91 which has cap screws 92 extending through the vertical leg thereof into the outer end of housing 24 while cap screws 94 extend downwardly through the frame member 96 of the bed and into the horizontal leg of the angle member and may extend completely therethrough into housing 24. This provides for rigid support of the motor on the frame of the bed and it becomes a simple matter to connect the output shaft of the motor by a sprocket 98 and chain 100 with the shaft that operates the particular adjustment of the bed that is under the control of the motor.

Since the motor of the present invention is not provided with limit switches, it is preferable for there to be a manually resettable thermal protector element 102 in one side of the line that will open the motor circuit if it remains stalled for more than an allowable length of time.

It is to be noted that the motor circuit is of the type in which the starting winding remains in circuit after centrifugal switch 90 opens and this provides for efficient and quiet operation of the motor at all times.

It will be understood that this invention is susceptible to modification in order to adapt it to different usages and conditions; and, accordingly, it is desired to comprehend such modifications within this invention as may fall within the scope of the appended claims.

I claim:

1. A switch arrangement especially adapted for use with a reversible electric motor having a relay controlled low voltage control system which comprises; a manually operable switch having an operating element on one side, a cable leading from the other side of the switch, a resilient support member attached to the said other side of the switch and extending along and enclosing said cable, and a spring clip adapted for detachably receiving and supporting said supporting element, said spring clip being slotted so that the supporting element can be removed therefrom and placed in adjusted position therealong.

2. A switch arrangement as set out in claim 1, wherein said clip comprises a strip of spring material with one end folded back and adapted for detachably engaging the side rail of a bed frame.

References Cited in the file of this patent

UNITED STATES PATENTS

| | | |
|---|---|---|
| 2,349,701 | Buttikofer | May 23, 1944 |
| 2,549,265 | Trant | Apr. 17, 1951 |
| 2,590,337 | McNabb | Mar. 25, 1952 |
| 2,592,492 | Trant | Apr. 8, 1952 |
| 2,605,481 | Burkhart | Aug. 5, 1952 |